US009716465B2

United States Patent
Rose et al.

(10) Patent No.: US 9,716,465 B2
(45) Date of Patent: Jul. 25, 2017

(54) PHOTOVOLTAIC ARRAY WITH ARRAY-ROOF INTEGRATION MEMBER

(71) Applicant: SunPower Corporation, San Jose, CA (US)

(72) Inventors: Douglas H. Rose, San Jose, CA (US); Carl Lenox, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 14/879,547

(22) Filed: Oct. 9, 2015

(65) Prior Publication Data

US 2016/0079911 A1 Mar. 17, 2016

Related U.S. Application Data

(63) Continuation of application No. 12/483,022, filed on Jun. 11, 2009, now abandoned.

(51) Int. Cl.
*E04D 13/18* (2014.01)
*H02S 20/23* (2014.01)
*F24J 2/04* (2006.01)

(52) U.S. Cl.
CPC .............. *H02S 20/23* (2014.12); *F24J 2/045* (2013.01); *Y02B 10/12* (2013.01); *Y02B 10/20* (2013.01); *Y02E 10/44* (2013.01)

(58) Field of Classification Search
CPC ........... H02S 20/23; F24J 2/045; Y02B 10/12; Y02B 10/20; Y02E 10/44
USPC .................. 52/173.3; 136/244, 246, 251
See application file for complete search history.

(56) References Cited

U.S. PATENT DOCUMENTS

| | | | | |
|---|---|---|---|---|
| 4,112,921 A | * | 9/1978 | MacCracken | F24J 2/045 126/570 |
| 4,194,497 A | * | 3/1980 | Gramer | F24J 2/045 126/623 |
| 4,194,498 A | * | 3/1980 | Mayerovitch | F24J 2/045 126/622 |
| 4,215,675 A | * | 8/1980 | Embree | F24J 2/045 126/623 |
| 4,244,355 A | * | 1/1981 | Stout | F24J 2/045 126/569 |

(Continued)

FOREIGN PATENT DOCUMENTS

| | | | | |
|---|---|---|---|---|
| FR | EP 0062582 A1 | * | 10/1982 | ............... F24J 2/045 |
| JP | 05280168 A | * | 10/1993 | |
| JP | 2001349019 A | * | 12/2001 | |

*Primary Examiner* — Adriana Figueroa
(74) *Attorney, Agent, or Firm* — Okamoto & Benedicto LLP (57) ABSTRACT

One embodiment relates to a photovoltaic (PV) apparatus. The PV apparatus includes a plurality of photovoltaic modules arranged in an array and attached to a support structure which is attached to a roof. Each of the photovoltaic modules comprises a plurality of photovoltaic cells. A first array-roof integration member is attached to a first side of the array. The array-roof integration member covers a gap between the first side of the array and the roof. Another embodiment relates to a method of installing a photovoltaic apparatus upon a sloped roof. Another embodiment relates to a kit for mounting a photovoltaic apparatus on a roof. Other embodiments, aspects and features are also disclosed herein.

18 Claims, 8 Drawing Sheets

(Side Cross-Sectional View)

(56) References Cited

U.S. PATENT DOCUMENTS

| | | | | | |
|---|---|---|---|---|---|
| 4,291,684 | A | * | 9/1981 | Werner | F24J 2/045 |
| | | | | | 126/570 |
| 4,372,292 | A | * | 2/1983 | Ort | F24J 2/045 |
| | | | | | 126/569 |
| 4,416,265 | A | * | 11/1983 | Wallace | F24J 2/045 |
| | | | | | 126/623 |
| 6,148,570 | A | * | 11/2000 | Dinwoodie | E04D 13/17 |
| | | | | | 136/244 |
| 6,495,750 | B1 | * | 12/2002 | Dinwoodie | F24J 2/4638 |
| | | | | | 136/244 |
| 6,570,084 | B2 | * | 5/2003 | Dinwoodie | F24J 2/523 |
| | | | | | 136/244 |
| 7,900,407 | B2 | * | 3/2011 | Plaisted | F24J 2/045 |
| | | | | | 136/244 |
| 2003/0010372 | A1 | * | 1/2003 | Dinwoodie | F24J 2/523 |
| | | | | | 136/244 |
| 2005/0166955 | A1 | * | 8/2005 | Nath | F24J 2/5205 |
| | | | | | 136/251 |
| 2007/0056579 | A1 | * | 3/2007 | Straka | E04D 13/033 |
| | | | | | 126/570 |
| 2008/0041442 | A1 | * | 2/2008 | Hanoka | B32B 17/10 |
| | | | | | 136/251 |
| 2008/0313976 | A1 | * | 12/2008 | Allen | H01L 31/048 |
| | | | | | 52/173.1 |
| 2009/0025314 | A1 | * | 1/2009 | Komamine | F24J 2/5207 |
| | | | | | 52/173.3 |
| 2009/0133739 | A1 | * | 5/2009 | Shiao | H01L 31/048 |
| | | | | | 136/251 |
| 2010/0236155 | A1 | * | 9/2010 | Lanza | E04D 1/30 |
| | | | | | 52/58 |
| 2010/0269429 | A1 | * | 10/2010 | Belikoff | F24J 2/5205 |
| | | | | | 52/173.3 |

* cited by examiner

FIG. 1
(Top Planar View)

FIG. 2
(Side Cross-Sectional View)

FIG. 3
(Front Cross-Sectional View)

FIG. 4 (Top Planar View)

FIG. 5 (Top Planar View)

FIG. 6A
(Front Cross-Sectional View)
(Conventional)

FIG. 6B
(Front Cross-Sectional View)

FIG. 7

PHOTOVOLTAIC ARRAY WITH ARRAY-ROOF INTEGRATION MEMBER

CROSS-REFERENCE TO RELATED APPLICATION

This application is a continuation of U.S. application Ser. No. 12/483,022, filed on Jun. 11, 2009, which is incorporated herein by reference in its entirety.

BACKGROUND OF THE INVENTION

1. Field of the Invention

The present invention relates generally to photovoltaic systems installed on roofs.

2. Description of the Background Art

Photovoltaic cells, also referred to as "solar cells," are well known devices for converting solar radiation to electrical energy. Photovoltaic cells may be packaged together in a photovoltaic module ("PV module"), which comprises a plurality of interconnected photovoltaic cells. A rigid frame may surround the solar cells of the PV module. A photovoltaic installation may include a PV array, which includes a plurality of interconnected PV modules. The PV array may be installed on a rooftop.

SUMMARY

One embodiment relates to a photovoltaic (PV) apparatus. The PV apparatus includes a plurality of photovoltaic modules arranged in an array and attached to a support structure which is attached to a roof. Each of the photovoltaic modules comprises a plurality of photovoltaic cells. A first array-roof integration member is attached to a first side of the array. The array-roof integration member covers a gap between the first side of the array and the roof so that the array appears integrated with the roof.

Another embodiment relates to a method of installing a photovoltaic apparatus upon a sloped roof. A support structure is attached to a roof, and a plurality of photovoltaic modules are attached to the support structure so as to form a photovoltaic array. A first array-roof integration member is attached to a first side of the photovoltaic array. The array-roof integration member covers a gap between the first side of the photovoltaic array and the roof so that the array appears integrated with the roof.

Other embodiments, aspects and features are also disclosed herein.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Residential photovoltaic systems are most commonly mounted on roofs using a retrofit installation system (for example, a rail system or a non-rail system) which provides a uniform plane for the modules and allows air flow under the modules. Such a retrofitted system may be installed on an asphalt or composite shingle roof without the need to remove existing roofing material. Unfortunately, the retrofit installation makes the array look like it is a separate structure on top of the roof, and it also reveals visual imperfections in the roof.

An alternative system uses roof-integrated solar panels. For example, the SunTile™ system available from Sun-Power Corporation of San Jose, Calif. has the advantage of appearing built-into a roof. However, such roof-integrated systems are generally meant to be installed exclusively with concrete tile roofs, and such systems require either installation in new construction, or removing existing roofing materials for a retrofit installation. Furthermore, the integrated solar panels typically run at a higher temperature and thus with a lower conversion efficiency The present application discloses the use of an array-roof integration member which is designed for asphalt or composite shingle roofs to provide a mechanism for visually integrating a solar array into a roof while allowing the mounting of the solar modules at conventional rail height. Advantageously, this permits adequate airflow under the solar panel array and lowers the cost of achieving the aesthetics of integrated solar panels for shingled roofs. Higher conversion efficiency is typically achieved versus integrated solar panels.

Figure 1:
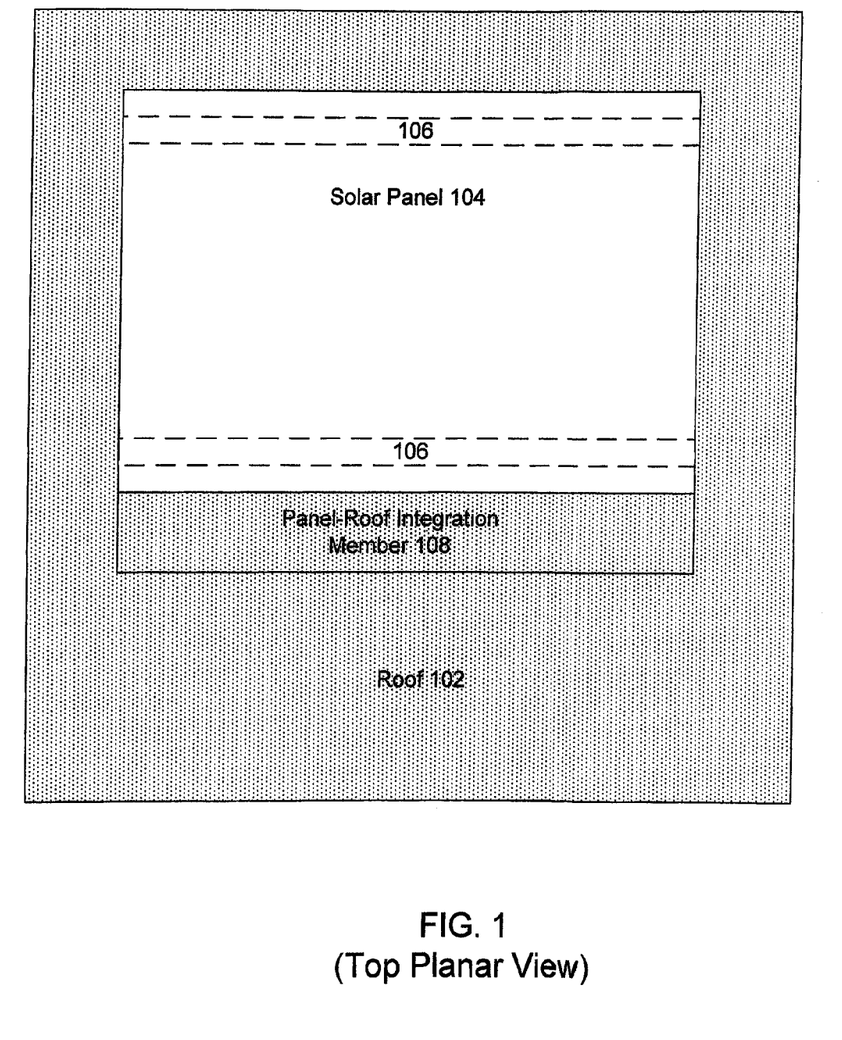
FIG. 1 is a top planar view of a solar panel on a roof with an array-roof integration member in accordance with an embodiment of the invention.
Figure 2:
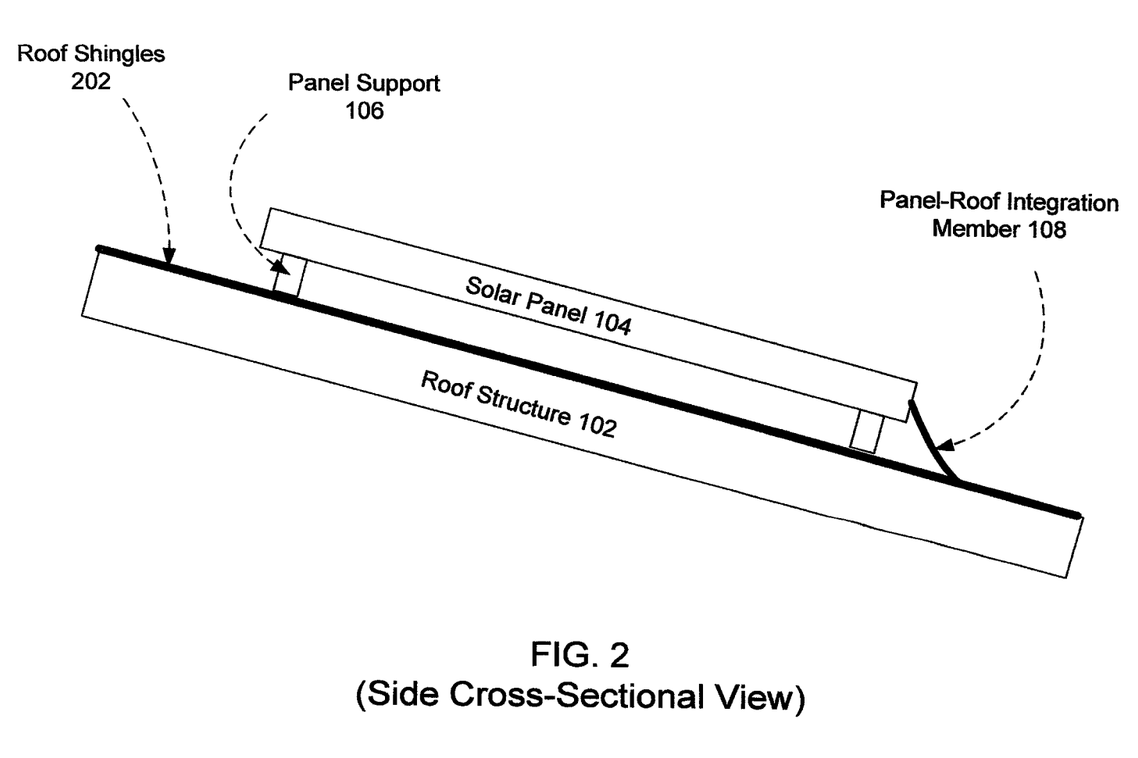
FIG. 2 is a side cross-sectional view of a solar panel on a roof with an array-roof integration member in accordance with an embodiment of the invention.
Figure 3:
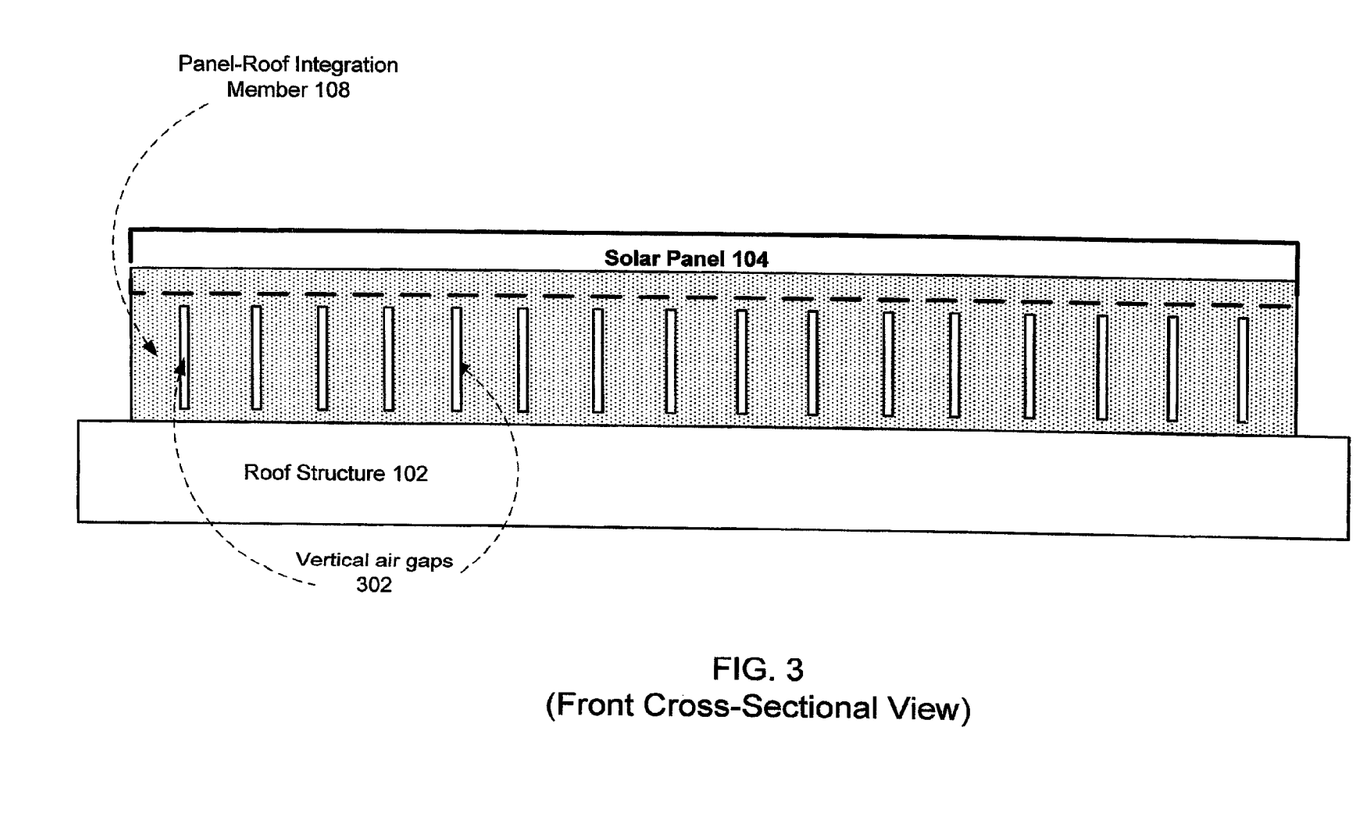
FIG. 3 is a front cross-sectional view of a solar panel on a roof with an array-roof integration member in accordance with an embodiment of the invention.

In FIGS. 1-3, a single solar panel is shown for purposes of simplicity in explanation. In practice, an array including a plurality of interconnected solar panels is installed on a roof, as shown, for example, in FIGS. 4-5.

FIG. 1 is a top planar view of a solar panel 104 on a roof 102 with an array-roof integration member 108 in accordance with an embodiment of the invention. The solar panel 104 is installed on the roof using panel supports 106. In one implementation, the panel supports 106 may comprise a rail system, for example. In other implementations, the panel supports 106 may comprise non-rail systems, such as, for example, the smart mount system available from SunPower Corporation of San Jose, Calif. or other non-rail systems.

FIG. 2 is a side cross-sectional view of a solar panel 104 on a roof structure 102 with an array-roof integration member 108 in accordance with an embodiment of the invention. This view shows a layer of roof shingles 202 on the roof structure 102. The array-roof integration member 108 is affixed to the frame of the solar panel 104 and may also be affixed to the roof 102.

In accordance with an embodiment of the invention, as shown in FIG. 2, the array-roof integration member 108 may be a flexible member so as to be configurable to a curved profile. In accordance with another embodiment, the array-roof integration member 108 may be configured with a surface color which is selected from a set of surface colors so as to visually match or be visually complementary to a surface color of the roofing material. In another embodiment, the array-roof integration member 108 may be a flexible member and also configured with a surface color which is selected from a set of surface colors so as to visually match or be visually complementary to a surface color of the roofing material.

As further shown in FIG. 2, the array-roof integration member 108 may cover a lower part of one side of the frame of the solar panel 104. Alternatively, the array-roof integration member 108 may cover an entire side of the frame of the solar panel 104.

As further shown, the array-roof integration member 108 is advantageously attached to a side of the solar panel 104 and to the roof 102. Various mechanisms may be used to attach the array-roof integration member 108, including, for example, screws, nails, or other attaching mechanisms.

FIG. 3 is a front cross-sectional view of a solar panel 104 on a roof 102 with an array-roof integration member 108 in accordance with an embodiment of the invention. This view is parallel to the plane of the roof and shows how the array-roof integration member 108 covers from view the space between the solar panel 104 and the roof 102.

As shown, one embodiment of the array-roof integration member 108 includes air gaps (or vents or slits) 302 to facilitate airflow underneath the solar panel 104. The air gaps 302 may be vertical as shown. In other implementations, the air gaps 302 may be otherwise configured, such as horizontally or in other forms.

In accordance with one embodiment, the air gaps 302 of the array-roof integration member 108 is configured on the bottom of the array with a net free vent area (NFVA) to provide the equivalent venting as at least a two inch stand-off height for rack mount systems if the sides do not allow airflow (so that the airflow is only in the top-to-bottom direction). Here, NFVA refers to the unblocked area in percentage. If the sides are open (so that airflow is also in the side-to-side direction), then of the array-roof integration member 108 may be configured with a smaller NFVA.

For example, given an installation where the sides do not allow for airflow, if the installed stand-off height is to be four inches and the array-roof integration member is nearly perpendicular to the plan of the array, then the air gaps 302 would be configured with at least fifty percent (50%) unblocked area or NFVA (2 inches divided by four inches). In a preferable embodiment, the array-roof integration member has slope relative to the array, thus providing a greater length of the member compared to the height of the array. Thus, for example, a roof-integration member of approximately 6" in length on an array with a 4" stand-off height could be configured with approximately 25-40% unblocked area to provide nearly equivalent airflow.

In one embodiment, the array-roof integration member 108 may be fabricated so as to include the same roof shingles on its surface as the roof 102. This advantageously provides for visual integration. The roof shingles may be attached to an underlying support piece of the array-roof integration member 108.

Alternatively, the array-roof integration member 108 may be fabricated to have a surface color and/or pattern and/or texture that matches or nearly matches the roof shingles. The array-roof integration members 108 may be fabricated with a set of colors and/or patterns to match a variety of roof shingles. In one implementation, the surface color and/or pattern may be formed on an array-roof integration member 108 made of molded plastic.

In an exemplary embodiment, the array-roof integration member 108 is designed to be compatible with and installed upon a roof with relatively thin shingles, such as, for example, composite or asphalt shingles. The relatively thin shingles may be, for example, less than half an inch in thickness.

Figure 4:
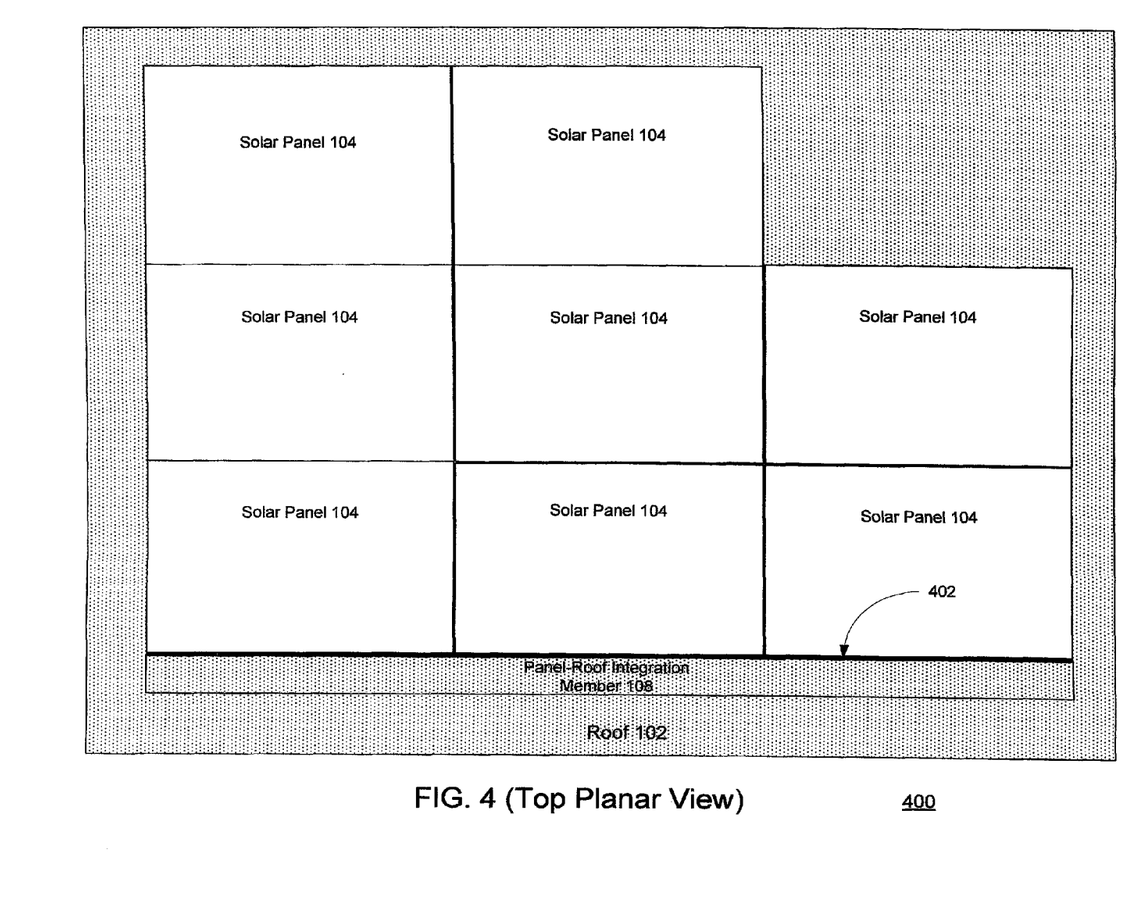
FIG. 4 is a top planar view of an array of solar panels on a roof with an array-roof integration member in accordance with an embodiment of the invention.

FIG. 4 is a top planar view of an array 400 of solar panels 104 on a roof 102 with an array-roof integration member 108 in accordance with an embodiment of the invention. As shown, the array 400 may not necessarily be rectangular, although it could be rectangular in a typical installation. Supports between the solar panels 104 and the roof 102 are not shown in this view. As shown, the array-roof integration member 108 may be affixed to one side of the array 400 of solar panels 104. In an exemplary embodiment, the array-roof integration member 108 may be affixed to the side of the array 400 which faces the bottom (lower) portion of the roof 102 so as to cover the gap between the solar panels 104 and the roof 102 from view by persons standing on the ground and viewing the roof 102. The array-roof integration member may include a means to remove debris that may collect underneath the member and/or the PV modules. For example, a hinge or detachment 402 may be located at the top of the integration member to allow pivot motion or detachment of at least a portion of the integration member.

Figure 5:
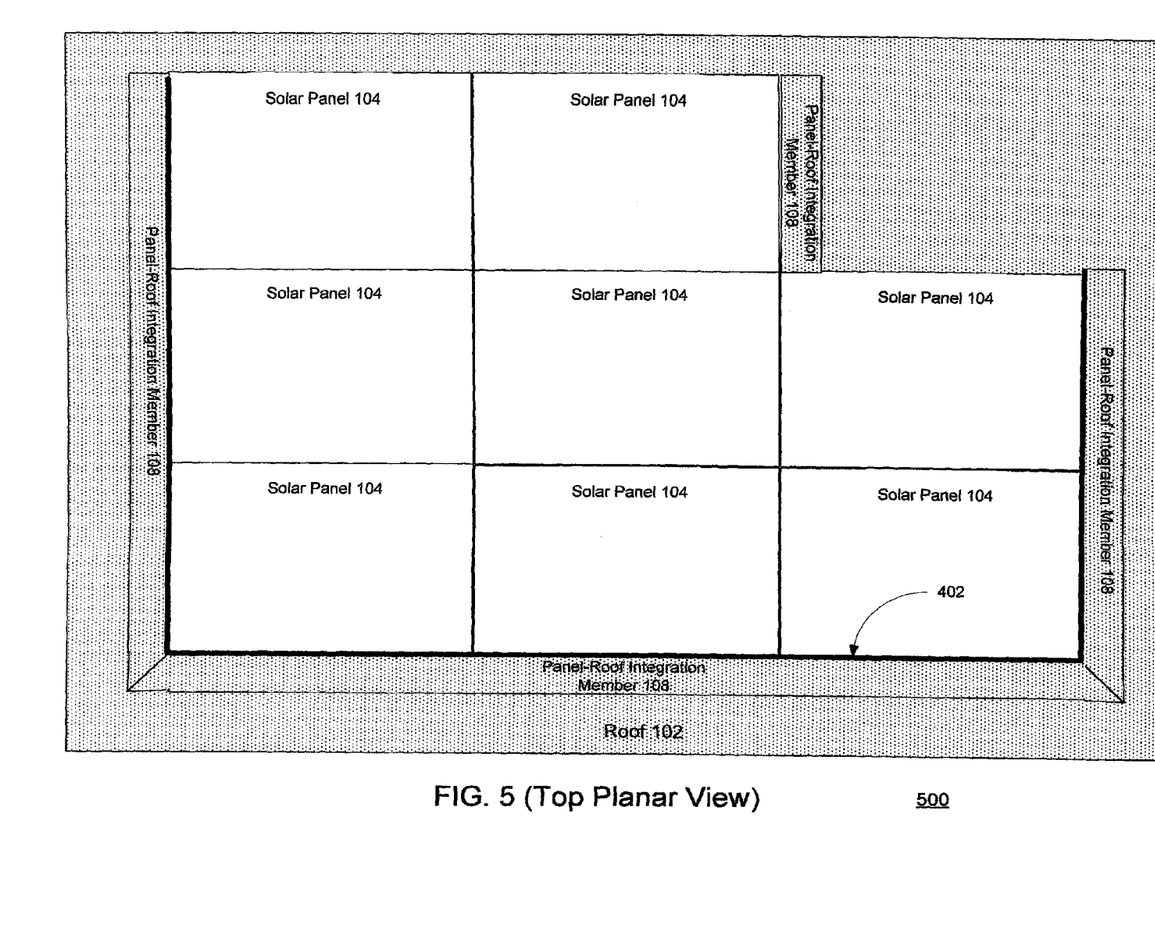
FIG. 5 is a top planar view of an array of solar panels on a roof with a plurality of array-roof integration members in accordance with an embodiment of the invention.

FIG. 5 is a top planar view of an array 500 of solar panels 104 on a roof 102 with a plurality of array-roof integration members 108 in accordance with an embodiment of the invention. As shown, the array 500 may not necessarily be rectangular, although it could be rectangular in a typical installation. Supports between the solar panels 104 and the roof 102 are not shown in this view. As shown, the array-roof integration members 108 may be affixed to two or more sides of the array 500 of solar panels 104. In the embodiment shown, the array-roof integration members 108 may be affixed to three sides of the array 500, all sides except for the side facing the top (upper) portion of the roof. In this case, the array-roof integration members 108 more completely cover the gap between the solar panels 104 and the roof 102 from view by persons standing on the ground and viewing the roof 102.

Figure 6A:
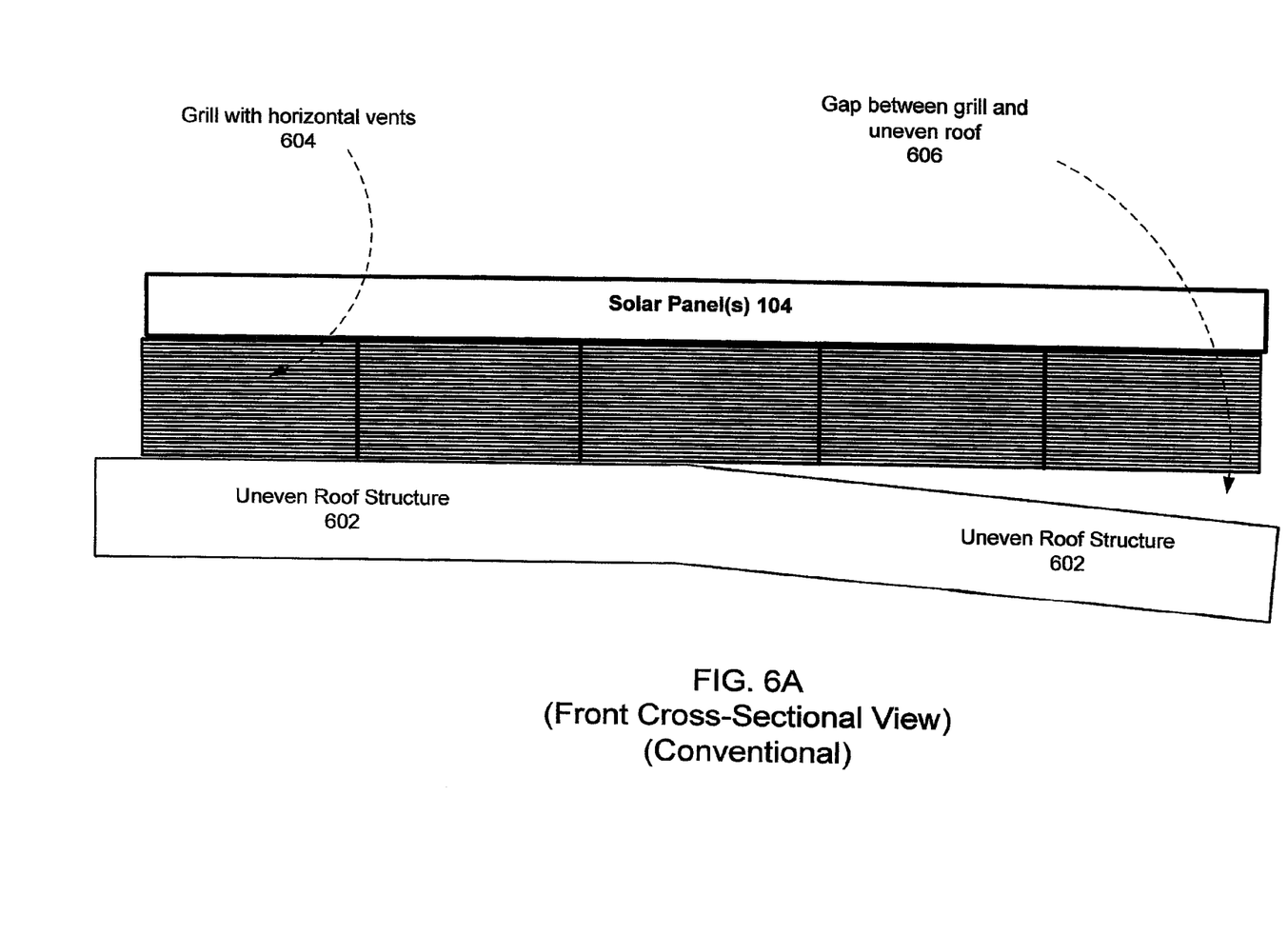
FIG. 6A is a front cross-sectional view of a solar panel or panels on an uneven roof structure with a conventional member.

FIG. 6A is a front cross-sectional view of a solar panel or panels 104 on an uneven roof structure 602 with a conventional rigid member 604. As shown, the conventional rigid member 604 may be attached to the frame of the solar panel(s) 104 and typically has horizontally-configured vents. In this example, the roof structure is shown to be uneven or bent (not straight). For purposes of illustration, the amount of uneven-ness shown in FIG. 6A is exaggerated compared with a typical uneven roof situation. Due to the uneven roof structure 602, there is a gap formed between the rigid member 604 and the roof 602. This gap 604 is undesirable and is generally aesthetically displeasing to people looking up at the roof. Furthermore, the conventional rigid member 604 is not selected to be either matched to the roof color or complementary to the roof color.

Figure 6B:
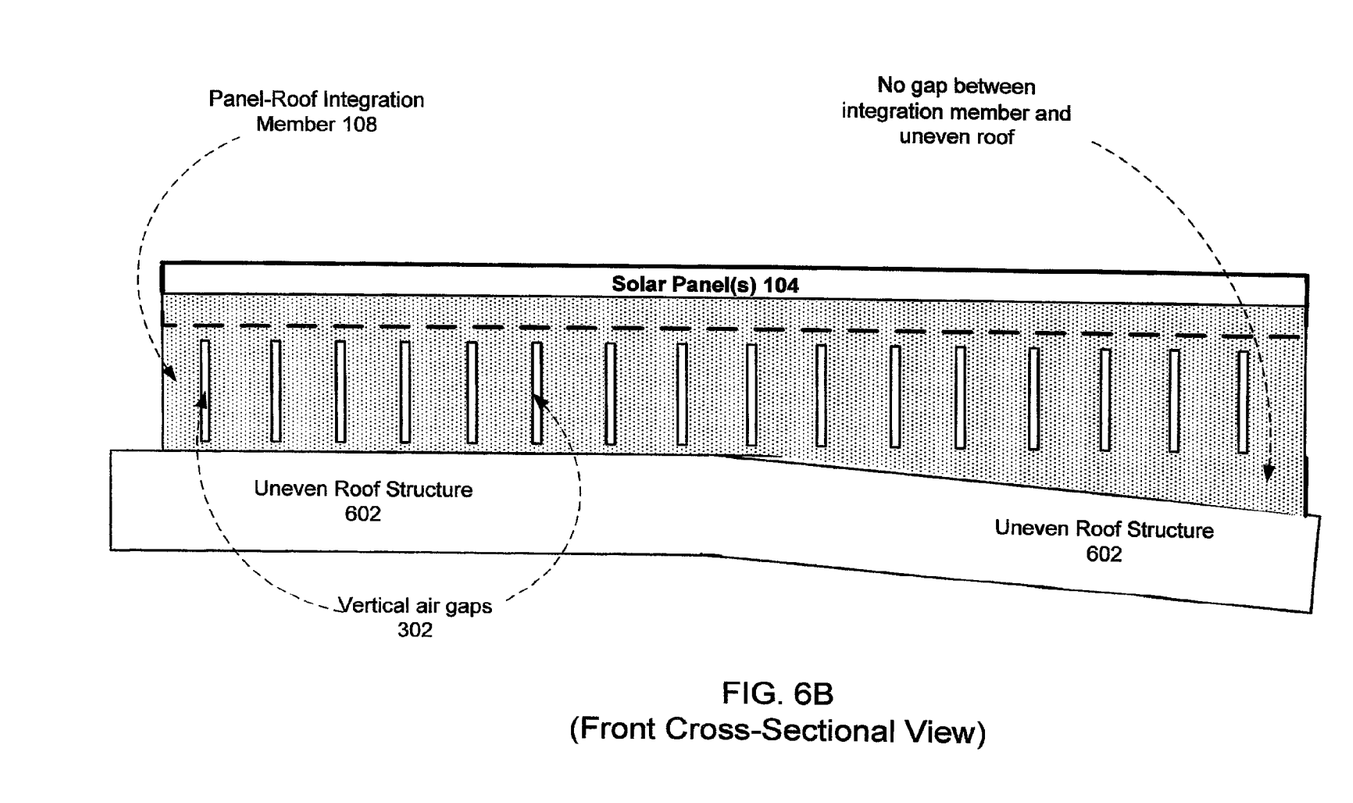
FIG. 6B is a front cross-sectional view of a solar panel or panels on an uneven roof structure with an array-roof integration member in accordance with an embodiment of the invention.

FIG. 6B is a front cross-sectional view of a solar panel or panels on an uneven roof structure with an array-roof integration member 108 in accordance with an embodiment of the invention. In this case, an array-roof integration member 108 is manufactured to be flexible such that it may be configured between the solar panel(s) 104 and the uneven roof structure 602. As shown, the array-roof integration member 108 may be installed to advantageously cover the entire gap between the solar panel(s) 104 and the uneven roof structure 602 such that there is no gap between the integration member 108 and the uneven roof 602. In addition, the array-roof integration member 108 may have a surface color which is selected from a set of surface colors so as to either match the roof color or be complementary to the roof color.

FIG. 6B further shows the air gaps (or vents or slits) 302 in the array-roof integration member 108 which differs from the horizontal vents of the conventional member 604. These air gaps 602 may be vertical as shown, but may also be otherwise configured, such as horizontally, in other implementations.

Figure 7:
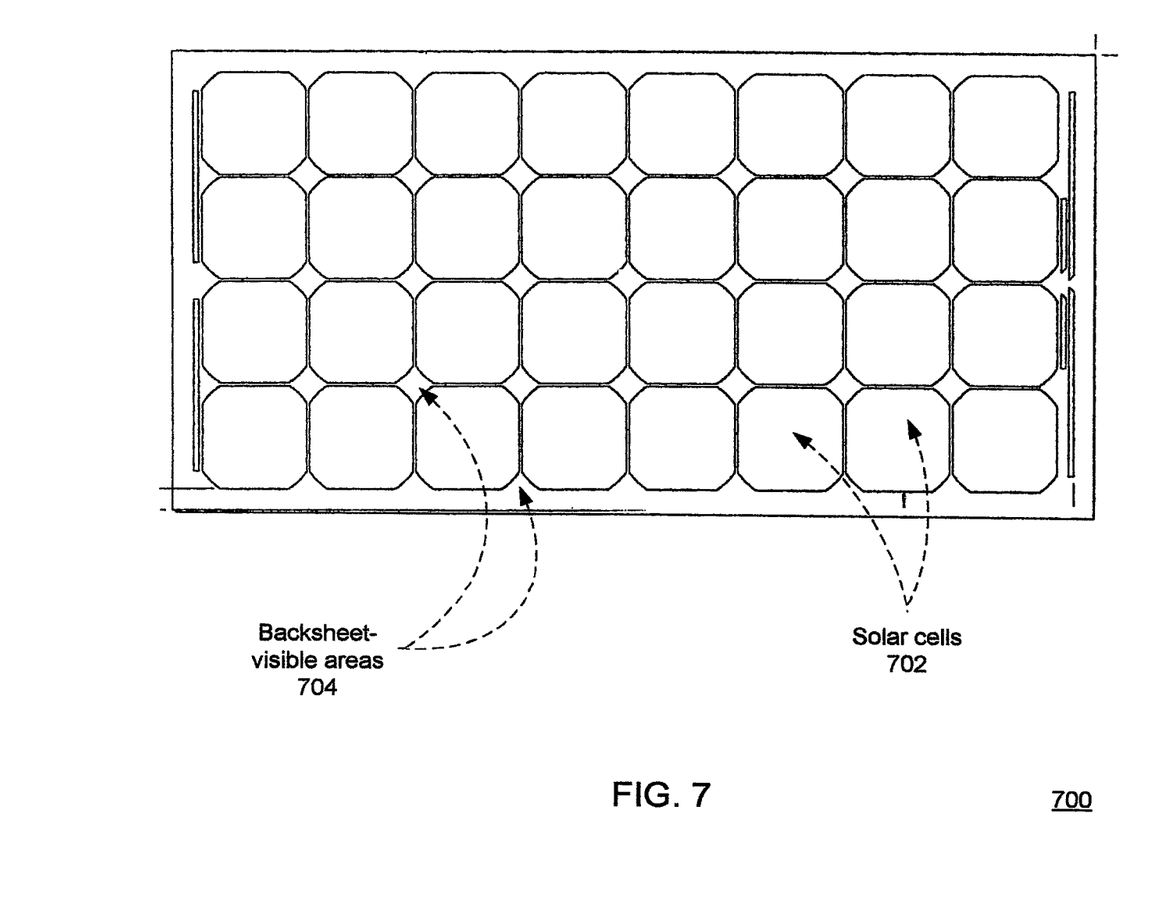
FIG. 7 is a top planar view of a solar panel (photovoltaic module) in accordance with an embodiment of the invention.

FIG. 7 is a top planar view of a solar panel (photovoltaic module) 700 in accordance with an embodiment of the invention. The solar panel 700 includes an array of solar cells 702. In addition, areas 704 are present between and around the solar cells 702. In these areas 704, a backsheet of the solar panel 700 is typically visible.

In one embodiment of the present invention, the solar panels 700 are fabricated with a clear (transparent or translucent) backsheet without color. When such a solar panel 700 with a clear backsheet is installed on the roof, the color of the roof surface shows through backsheet-visible areas 704. This advantageously provides an array of areas on the solar panel which match the roof surface in color. In other words, it provides an automatic color tie-in between the solar panel array and the surrounding roof area.

Moreover, the solar panel 700 with the clear backsheet may be further fabricated with bifacial solar cells. Such a configuration advantageously provides further collection of solar energy from light passing through the clear backsheet-visible areas 704 to the backside of the solar cells 702.

In an alternate embodiment, the solar panels 700 are fabricated with a backsheet having a color to match or complement the color of the roof surface. Furthermore, the array-roof integration member(s) 108 may also be fabricated to have a color to match or complement the color of the roof surface. In one specific implementation, grey colored backsheets and panel-integration member(s) may be used for roofs in a "cool" color family, and brown colored backsheets and panel-integration member(s) may be used for roofs in a "warm" color family.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A photovoltaic apparatus comprising: a support structure attached to a surface of a sloped roof;
a plurality of photovoltaic modules having a frame surrounding a periphery of the photovoltaic module attached to the support structure; and a first array-roof integration member that is attached to the surface of the roof and to a lower side of the frame of a first photovoltaic module in the plurality of photovoltaic modules, and extending at an angle outwardly away from the plurality of photovoltaic modules and the support structure;
the first array-roof integration member covering a gap between the first photovoltaic module and the surface of the roof, the first array-roof integration member comprising a flexible member that follows a contour of the sloped roof and has a plurality of air vents.

2. The photovoltaic apparatus of claim 1, wherein the first-array roof integration member comprises a top portion that is attached to the lower side of the frame of the first photovoltaic module and a bottom portion that is attached to the surface of the roof.

3. The photovoltaic apparatus of claim 1, wherein the first-array roof integration member has a curved surface.

4. The photovoltaic apparatus of claim 1, wherein the first array-roof integration member contacts only one side of the frame of the first photovoltaic module.

5. The photovoltaic apparatus of claim 1, wherein the plurality of air vents provide a predetermined minimum net free vent area.

6. The photovoltaic apparatus of claim 1, further comprising:
a clear backsheet in each of the plurality of photovoltaic modules; and
areas on each of the plurality of photovoltaic modules through which the backsheet is visible.

7. The photovoltaic apparatus of claim 1, wherein the first photovoltaic module has a colored back sheet chosen to complement or match a color of the surface of the roof.

8. The photovoltaic apparatus of claim 1, further comprising:
a second array-roof integration member that is attached to a second photovoltaic module in the plurality of photovoltaic modules, the second array-roof integration member covering a gap between a rigid frame of the second photovoltaic module and the surface of the roof.

9. The photovoltaic apparatus of claim 1, further comprising:
a mechanism at a top of the first array-roof integration member to allow a pivot motion of at least a portion of the first array-roof integration member.

10. The photovoltaic apparatus of claim 1, wherein the first array-roof integration member has a same color as the surface of the roof.

11. A method of installing a photovoltaic apparatus on a roof, the method comprising:
attaching a support structure to a top surface of a sloped roof;
attaching a plurality of photovoltaic modules having a frame surrounding a periphery of each photovoltaic module to the support structure; and attaching a first array-roof integration member to the surface of the roof and to a lower side of a frame of a first of the photovoltaic module in the plurality of photovoltaic modules so as to follow a contour of the top surface of the roof, the first array-roof integration member extending at an angle outwardly away from the plurality of photovoltaic modules and the support structure;
the first array-roof integration member comprising a flexible member with a plurality of air vents.

12. The method of claim 11, further comprising:
attaching a second array-roof integration member to a second photovoltaic module in the plurality of photovoltaic modules so as to cover a gap that extends between the second photovoltaic module and the top surface of the roof.

13. The method of claim 12, wherein the plurality photovoltaic modules is formed as an array and the first array-roof integration member is on one side of the array and the second array-roof integration member is on another side of the array.

14. The method of claim 11, further comprising:
providing the support structure, the plurality of photovoltaic modules, and the first array-roof integration member as an installation kit in installing a photovoltaic apparatus.

15. A kit for mounting a photovoltaic apparatus on a roof comprising:
a support structure configured for attachment to a surface of a sloped roof;
a plurality of photovoltaic modules having a frame surrounding a periphery of each photovoltaic module that are configured to be attached to the support structure; and
an array-roof integration member that is configured to be attached to the surface of the roof and to a lower side of a frame of a photovoltaic module in the plurality of photovoltaic modules to cover a gap between the photovoltaic module and the surface of the roof by following a contour of the surface of the roof, the array-roof integration member comprising a flexible member with a plurality of air vents;
wherein after installation the array-roof integration member extends at an angle outwardly away from the plurality of photovoltaic modules and the support structure.

16. The kit of claim 15, wherein the array-roof integration member is configurable to have a curved profile.

17. The kit of claim 15, wherein the array-roof integration member is configured to be attached only to one side of the frame of the photovoltaic module.

18. The kit of claim 15, wherein the array-roof integration member has a same color as the surface of the roof.

* * * * *